Patented July 2, 1940

2,206,288

UNITED STATES PATENT OFFICE 2,206,288

MANUFACTURE OF ACETYL CELLULOSE

Carl J. Malm, Rochester, N. Y., assignor to Eastman Kodak Company, Rochester, N. Y., a corporation of New Jersey No Drawing. Application August 5, 1939, Serial No. 288,669

6 Claims. (Cl. 260—227)

This application relates to the preparation of acetyl cellulose in which the cellulose is pretreated with a mixture of glacial acetic acid and less than .75% and preferably .1–.5% of sulfuric acid, based on the weight of the cellulose, subsequently cooled to a temperature of less than 70° F. followed by addition of substantially all the acid anhydride for acylation, again cooling and subsequently adding the remainder of the catalyst to be employed for the acylation.

In the making of acetyl cellulose either the cellulose has been activated without the use of catalyst or substantially all of the catalyst for the acylation has been incorporated in the pretreatment liquid. In the few cases where the catalyst has been added piecemeal there has in the past been no great improvement over cases where all of the sulfuric acid has been added all at once. In the making of acetyl cellulose in which the viscosity must be maintained it is necessary that the temperature be restricted. The cooling of a large acylation mixture during the reaction accompanied by the obtaining of a uniform product of good clarity is difficult.

One object of my invention is to provide a process for the preparation of acetyl cellulose which decreases the difficulties of cooling a large batch of cellulose being acylated. A further object of my invention is to assure a product of good uniformity. A still further object of my invention is to provide a process for the preparation of acetyl celluloses of improved clarity.

I have found that if cellulose is pretreated with an excess of glacial acetic acid containing no other catalyst than .1%–.5% sulfuric acid (sp. gr. 1.84) at a temperature of 100°–130° F., followed by cooling to less than 70° F., addition of substantially all the acid anhydride necessary for the acylation, cooling to below 55° F. and addition of the remainder of the acylation catalyst followed by the acylation that the temperature of the mass is readily controlled and a product of good uniformity and high clarity is obtained.

I have found that by having such a small amount of sulfuric acid in the activation step, it is possible to add all of the acetic anhydride at once without causing any appreciable esterification of the cellulose (less than 10% acetyl being in the cellulose at the time of the second addition of sulfuric acid). By having substantially all of the anhydride present in the mass it is possible to cool the reaction mixture to 50° F. without causing any crystallization of the acetic acid which is present. Also when the mass is cooled down such as to 50° F. before the beginning of the esterification, it is possible to control the esterification without using much cooling, particularly since all the water present has been previously converted to acid by the addition of the anhydride. Because little or no cooling is necessary during the esterification, uniform temperature conditions prevail throughout the mass which results in a uniform product.

The catalyst need not be present throughout the entire pretreatment. For instance the cellulose can be first presoaked with glacial acetic acid for about 2 hours at 100° F. in the absence of catalyst and the catalyst in solution in acetic acid can then be added and the treatment continued for a further 2 hours. In the pretreatment it is desirable that there be sufficient acid present to assure thorough soaking of the cellulose. A temperature of 100° F. is ordinarily preferred for the pretreatment of the cellulose.

After the cellulose is subjected to the desired pretreatment the mass consisting of cellulose, acetic acid and less than .75% and preferably .1–.5% sulfuric acid (based on weight of cellulose) is cooled to a temperature of less than 70° F. such as 65° F. The cooling of the mass may be speeded up by agitation. It is desirable that the cooling means have a temperature above that which would cause the acetic acid to crystallize. The mass should be cooled to a temperature above that at which crystallization of the acetic acid will occur.

After the mass has been cooled to a temperature below 70° F. and above that at which crystallization will occur, substantially all of the anhydride (usually acetic anhydride) necessary for the subsequent esterification is added in cooled condition. The anhydride is preferably at a temperature of 30–40° F. and at least less than 50° F. The addition of the cooled anhydride causes a momentary lowering of the temperature of the cellulose mass. However the anhydride converts any moisture present to acid, the heat of this reaction raising the temperature of the mass depending on the amount of moisture present. With the use of cellulose having a moisture content of 1–2% this rise is usually about 8 or 10 degrees F.

It is now possible to cool the mass down to a low temperature such as 50° F. as the large anhydride content prevents crystallization of the acetic acid at this low temperature. The only limit on the minimum temperature is that no substantial crystallization of the acetic acid occurs.

The additional sulfuric acid for catalyzing the reaction is then added in the form of a mixture with acetic acid. This addition starts the esterification. Because of the cold condition of the mass at the start of the esterification, little if any cooling is necessary. Cooling after the doping has started is unnecessary. The maximum temperature reached in the esterification is usually not more than 100° F.

After the cellulose has been acetylated as shown by its complete dissolution in the reaction mixture, the cellulose ester may be hydrolyzed to acetone-solubility such as by adding dilute acetic acid and allowing to stand for the required time at a temperature of approximately 100° F.

The following example illustrates my invention:

500 lbs. of refined cotton linters were treated with 2600 lbs. of glacial acetic acid for two hours at 100° F. 600 lbs. of glacial acetic acid containing 500 c. c. of sulfuric acid was added and the treatment at 100° F. was continued for two hours.

The mass was cooled to approximately 65° F. and 1400 lbs. of acetic anhydride which had been cooled to 30° F. was added. The mass was then cooled down to not more than 50° F. and a mixture of 7,500 c. c. of sulfuric acid (concentrated) and 30 lbs. of glacial acetic acid was stirred into the mass thus inducing esterification. The esterification was carried out in such a manner that the maximum temperature reached did not exceed 80° F. The esterification was completed in 2–3 hours. The cellulose acetate formed was hydrolyzed by adding 700 lbs. of aqueous acetic acid of 50% concentration and holding the mass at 100° F. until acetone-solubility was attained.

It is preferred that the proportion of sulfuric acid in the addition which induces the principal esterification be not more than 85%. In the interests of economy it is preferred that the sulfuric acid be present in an amount of at least 50% of the mixture added.

If more than the prescribed proportion of sulfuric acid (such as 1%) were used in the pretreatment, the addition of the acetic anhydride would cause some esterification. Upon subsequent cooling this partially acetylated cellulose will gel a little and thus form the seed for the gelling of the cellulose ester formed in the esterification. By my process this formation of material which seeds the gelling of cellulose esters is avoided.

Due to the clarity of the cellulose esters prepared in accordance with my invention, both in solution and in sheet form, they are exceptionally valuable in making products in which the transparency of the cellulose derivative is of value. For instance, a colloidized sheet of this ester may be employed in the making of laminated glass. These esters are also suitable for use in the making of photographic film base, particularly for motion picture purposes where the light is transmitted through the film. These esters, however, because of their brilliance, are also suitable for use in making synthetic yarn, lacquers or for various coating compositions. A plasticizer such as triphenyl phosphate may be employed with the ester if desired.

Other lower fatty acid esters of cellulose, such as cellulose acetate propionate or cellulose acetate butyrate, may be prepared in accordance with my invention, such as by incorporating propionic or butyric acid in one or both of the pretreating steps or by adding it with the anhydride at the start of the esterification. The esters prepared, in accordance with my invention, may be colloidized by the use of other solvents than acetone, such as a mixture of an alkylene chloride, particularly ethylene chloride with alcohol, or a mixture of an aromatic hydrocarbon such as benzene with a lower aliphatic alcohol.

My invention is adapted for use in esterification processes in which the cellulose dissolves in the reaction mixture. The solvent, which is usually present, is acetic acid, although the presence of other solvents, such as ethylene or methylene chloride, therein would not ordinarily be objectionable. The acid, which is employed in the pretreatment steps, is ordinarily carried on into the esterification and forms part of the esterification bath. Although it would be possible to press out the pretreating acid and add further acid or other solvent, as desired, in the esterification, in the interest of economy it is preferred that all of the pretreating acid be carried over into the esterification.

After separating the ester from its reaction mixture by precipitation, it is desirable to wash it counter-currently in the manner described and claimed in Clarke and Clarke Patent No. 2,036,397. The ester may also be stabilized in accordance with the method described in that patent, where necessary.

If desired, the ester prepared in accordance with my invention may be reduced to a minimum acetone viscosity by washing several times in distilled water, as described and claimed in Malm Patent Number 2,126,489, issued August 9, 1938. The resulting ester may be made into yarn such as by dissolving in acetone and spinning by forcing the solution through a spinneret into an evaporative atmosphere.

The viscosity of the ester prepared in accordance with my invention may be increased by washing with water containing a very small proportion of an alkaline earth metal salt, such as calcium carbonate, as described and claimed in Malm Patent Number 2,126,488, issued August 9, 1938.

Although my process is particularly intended for the acylation of refined cotton linters or refined sulfite wood pulp having a high alpha cellulose content, it may be employed on any esterifiable cellulose material. Due to the effectiveness of the preliminary treatment of my process, a better product will be obtained than by an ordinary acetylation process using the same type of cellulose as the starting material.

I claim:

1. A process for preparing an acetyl cellulose of high clarity which comprises pretreating cellulose with an activating bath comprising acetic acid and .1–.5% of sulfuric acid, based on the weight of the cellulose; cooling the mass to a temperature less than 70° F. but above that at which the acetic acid crystallizes, adding sufficient precooled acetic anhydride to completely acylate the cellulose, cooling to a temperature of not more than 50° F., adding sufficient additional sulfuric acid, diluted with a diluent, to induce esterification and allowing the esterification to proceed until the cellulose is substantially completely acylated.

2. A process of preparing an acetyl cellulose of high clarity which comprises presoaking the cellulose with a catalyst-free liquid essentially consisting of acetic acid until the cellulose is swollen, then pretreating the cellulose with an activating bath comprising a mixture of glacial acetic acid and .1–.5% of sulfuric acid, based on the weight of the cellulose, cooling the mass to a temperature between 70° F. and that at which the acetic acid will crystallize, adding sufficient precooled acetic anhydride to completely acylate the cellulose, cooling to a temperature of not more than 50° F., adding sufficient additional sulfuric acid, diluted with a diluent, to induce esterification and allowing the esterification to proceed until the cellulose is substantially completely acylated.

3. A process of preparing an acetyl cellulose of high clarity which comprises pretreating 500 pounds of cellulose with an activating bath comprising acetic acid and 500 cc. of sulfuric acid cooling the mass to a temperature of approximately 65° F., adding sufficient acetic anhydride, having a temperature of 30–40° F., to the mass to completely acylate the cellulose, cooling to a temperature of 50° F., adding sufficient additional sulfuric acid, diluted with acetic acid, to induce esterification and allowing the esterification to proceed until the cellulose is substantially completely acylated.

4. A process of preparing an acetyl cellulose of high clarity which comprises pretreating the cellulose with an activating bath comprising sufficient lower fatty acid to thoroughly wet the mass and less than .75% but more than .1% of sulfuric acid, based on the weight of the cellulose, cooling the mass to a temperature between 70° F. and that at which any acetic acid present crystallizes, adding sufficient precooled acetic anhydride to completely acylate the cellulose cooling to a temperature of approximately 50° F., adding sufficient additional sulfuric acid, diluted with acetic acid, to induce esterification and allowing the esterification to proceed until the cellulose is substantially completely acylated.

5. A process of preparing cellulose acetate of high clarity which comprises presoaking the cellulose in a catalyst-free bath essentially consisting of acetic acid until the cellulose is swollen, then pretreating the swollen cellulose with a mixture essentially consisting of acetic acid and .1–.5% of sulfuric acid, based on the weight of the cellulose, at a temperature of approximately 100° F., cooling the mass to approximately 55° F., adding sufficient acetic anhydride to completely acylate the cellulose, the anhydride having a temperature of 30–40° F., cooling the mass to a temperature of approximately 50° F., adding sufficient additional sulfuric acid, diluted with acetic acid, to induce esterification and allowing the esterification to proceed until the cellulose is substantially completely acylated.

6. A process of preparing an acetyl cellulose of high clarity which comprises pretreating the cellulose with an activating bath comprising glacial acetic acid and .1–.5% of sulfuric acid, based on the weight of the cellulose, for approximately two hours, cooling the mass to a temperature between 70° F. and that at which the acetic acid will crystallize, adding sufficient precooled acetic anhydride to completely acylate the cellulose, cooling to a temperature of not more than 50° F., adding 5.5–5.9% of sulfuric acid (based on the weight of the cellulose) diluted with acetic acid and allowing the esterification to proceed until the cellulose is substantially completely acylated, allowing the temperature in the esterification to rise no higher than 80–100° F.

CARL J. MALM.